(12) United States Patent
Beke

(10) Patent No.: US 12,554,447 B2
(45) Date of Patent: Feb. 17, 2026

(54) SYSTEM FOR PROCESSING 3D PRINT JOBS

(71) Applicant: Ultimaker B.V., Geldermalsen (NL)

(72) Inventor: Chris Ter Beke, Geldermalsen (NL)

(73) Assignee: Ultimaker B.V., Zaltbommel (NL)

( * ) Notice: Subject to any disclaimer, the term of this patent is extended or adjusted under 35 U.S.C. 154(b) by 91 days.

(21) Appl. No.: 18/571,760

(22) PCT Filed: Jul. 1, 2022

(86) PCT No.: PCT/NL2022/050379
§ 371 (c)(1),
(2) Date: Dec. 19, 2023

(87) PCT Pub. No.: WO2023/277692
PCT Pub. Date: Jan. 5, 2023

(65) Prior Publication Data
US 2024/0289076 A1 Aug. 29, 2024

(30) Foreign Application Priority Data
Jul. 2, 2021 (NL) ..................................... 2028612

(51) Int. Cl.
*G06F 3/12* (2006.01)
(52) U.S. Cl.
CPC .......... *G06F 3/1288* (2013.01); *G06F 3/1206* (2013.01); *G06F 3/1222* (2013.01); *G06F 3/1265* (2013.01); *G06F 3/1268* (2013.01)
(58) Field of Classification Search
CPC .... G06F 3/1288; G06F 3/1206; G06F 3/1222; G06F 3/1265; G06F 3/1268
See application file for complete search history.

(56) References Cited

U.S. PATENT DOCUMENTS

| 8,189,225 | B1* | 5/2012 | Lo ........................ | G06F 3/1292 |
| | | | | 358/1.15 |
| 9,489,157 | B2* | 11/2016 | Kavanapillil ......... | G06F 3/1285 |
| 2012/0008164 | A1* | 1/2012 | Nanaumi .............. | G06F 3/1203 |
| | | | | 358/1.15 |
| 2012/0092723 | A1* | 4/2012 | Jaudon ................. | G06F 3/1288 |
| | | | | 358/1.15 |
| 2012/0120437 | A1* | 5/2012 | Nanaumi .............. | G06F 3/1288 |
| | | | | 358/1.15 |

(Continued)

FOREIGN PATENT DOCUMENTS

WO 2013/052641 A2 4/2013

*Primary Examiner* — Nicholas Pachol
(74) *Attorney, Agent, or Firm* — Ipsilon USA—NLO

(57) ABSTRACT

A system (100) for processing 3D print jobs is described with a first software module (102) to receive a print job request (111) from a user application (101) running on a remote computing device, the print job request comprising a location indicator indicating a storage location of a print file to be printed. The first software module is arranged to send a print job ID (111') back to the user application. A second software module (103) receives a print request call (115) from the user application, comprising the print job ID and a printer ID. The second software module is arranged to send the print job ID (116) to the first software module, and to receive a print job response (116') back from the first software module, the print job response comprising the print job ID, the print job name and the location indicator of the print file.

9 Claims, 5 Drawing Sheets

(56) References Cited

U.S. PATENT DOCUMENTS

| | | | | |
|---|---|---|---|---|
| 2013/0033714 A1* | 2/2013 | Nakagawa | ............ | G06F 3/1254 |
| | | | | 358/1.9 |
| 2013/0163027 A1* | 6/2013 | Shustef | ............... | H04L 63/0209 |
| | | | | 358/1.14 |
| 2013/0346361 A1* | 12/2013 | Hashimoto | ............. | G06F 16/16 |
| | | | | 707/808 |
| 2014/0049797 A1* | 2/2014 | Huster | .................. | G06F 3/1267 |
| | | | | 358/1.15 |
| 2017/0094103 A1* | 3/2017 | Osadchyy | .......... | H04N 1/00042 |
| 2017/0126674 A1* | 5/2017 | Lee | ........................ | B33Y 10/00 |
| 2017/0214762 A1* | 7/2017 | Swain | ..................... | G06F 9/546 |
| 2017/0322755 A1* | 11/2017 | Kouno | .................... | G06F 3/122 |
| 2018/0107531 A1* | 4/2018 | Lee | ........................ | G06F 16/176 |
| 2019/0075176 A1* | 3/2019 | Nguyen | .................. | A63F 13/46 |
| 2019/0082058 A1* | 3/2019 | Aoki | .................... | H04N 1/32406 |
| 2019/0278878 A1* | 9/2019 | Sawyer | ................. | G06F 21/602 |
| 2020/0310700 A1* | 10/2020 | Nishida | ................. | G06F 3/1257 |
| 2020/0409627 A1 | 12/2020 | Alacar et al. | | |
| 2022/0171586 A1* | 6/2022 | Wang | ..................... | G06F 3/1203 |
| 2022/0197251 A1* | 6/2022 | Sawyer | ............ | G05B 19/41865 |
| 2022/0224798 A1* | 7/2022 | Huster | ............... | H04N 1/00204 |
| 2022/0291886 A1* | 9/2022 | Siddarth | ............... | G06F 3/1265 |

* cited by examiner

SYSTEM FOR PROCESSING 3D PRINT JOBS

A system for processing 3D print jobs is described with a first software module to receive a print job request from a user application running on a remote computing device, the print job request having a location indicator indicating a storage location of a print file to be printed. The first software module is arranged to send a print job ID back to the user application. A second software module receives a print request call from the user application that has the print job ID and a printer ID. The second software module is arranged to send the print job ID to the first software module, and to receive a print job response back from the first software module, the print job response including the print job ID, the print job name and the location indicator of the print file.

FIELD OF THE INVENTION

The present invention relates to a system for processing 3D print jobs and to a method of processing print jobs. The invention also relates to a computer program product implementing the method.

BACKGROUND ART

Cloud printing is the technology that enables 3D printers to be accessed over a network through cloud computing. There are two types of 3D cloud printing. On the one hand, consumer-based cloud printing connects any application to cloud-enabled home printers that people own or have access to. Using this technology, people can take digital media as their primary communications tool and create a printed object when they need it. On the other hand, professional cloud printing enables artist, companies and content owners to print their digital work by leveraging networks of production facilities through cloud computing technology. So, professional 3D cloud printing allows for the ad-hoc transformation of digital information into physical forms in 3D.

While these 3D cloud printing options do simplify the printing process, all the print data must travel through the public cloud as it makes its journey from device to printer. It also means no printing is possible when the cloud is too slow or when there is a connection outage. True cloud print solutions do not require any on-premise server in the company complementing the cloud, whether that is a print server or an application server, or a "gateway" service.

Today many solution providers just interface an on-premise server with a cloud database. This works fine for most users, but some may not allow the sharing of print files in the cloud environment of the solution provider since these print files may contain intellectual property owned by the user.

SUMMARY OF THE INVENTION

The aim of the present invention is to provide a cloud-based printing system that at least solves one of the disadvantages of the prior art.

According to a first aspect of the present invention, there is provided a system for processing 3D print jobs, the system comprising:
 a first software module arranged to receive a print job request from a user application running on a remote computing device, the print job request comprising a print job name and a location indicator indicating a storage location of a print file to be printed, the storage location being accessible by the user application but not by the first software module, wherein the first software module is arranged to send a print job ID back to the user application;
 a second software module arranged to receive a print request from the user application, the print request comprising the print job ID and a printer ID, wherein the second software module is further arranged to send the print job ID to the first software module, and to receive a print job response back from the first software module, the print job response comprising the print job ID, the print job name and the location indicator of the print file;
 a printer message queue arranged to store printer messages, wherein the second software module is arranged to push a printer message to the printer message queue, wherein the printer message comprises the location indicator of the print file;
 a web-socket gateway arranged to retrieve the printer message from the printer message queue and forward a dedicated printer message to a 3D printer, the dedicated printer message comprising the location indicator of the print file.

The modules mentioned above provide for a cloud-based print job processing wherein the modules process a link to a storage, without being able to access that storage. In this way the intellectual property data is kept out of the cloud and allows users to configure their own storage system and pass reference links (i.e. the location indicator) to connected 3D printers via a cloud environment. The user operating the remote computing device, can keep the print file storage behind a firewall to ensure that a service provider has absolutely no access to it. In this context, remote computing device means a computing device remote from the computing devices running the first and/or second software modules.

It is noted that the print job request from the user application does not contain print instructions that define the way of building a 3D object. These instructions are stored in a print file on a user accessible storage, such as a local storage within an IP-network of the user. This IP-network may comprise a LAN, a WLAN, a VLAN or a subnet of a public cloud connected via a VPC connector arranged to connect a private/on-premises network with a public cloud network.

In an embodiment, the print job request further comprises at least one of a print file size and a print file content type.

In an embodiment, the print job response further comprises at least one of the print file size and the print file content type.

In an embodiment, the web-socket gateway is arranged to forward the print file size and the print file content type to the 3D printer.

In an embodiment, the system further comprises an IP-network secured by means of a fire-wall, wherein the IP-network comprises a computing device running the user application.

In an embodiment, the IP-network comprises a local storage arranged to store the print file. Alternatively, the local storage may be a private cloud storage bucket.

In an embodiment, each of the first software module and the second software module are implemented as an API module in a cloud-based computing system, such as Google Cloud. It is noted that the first and second software module could be integrated into one single API module depending on the techniques used and requirements of the implementation.

According to a further aspect, there is provided a method of processing print jobs, the method comprising:

receiving a print job request by a first software module from a user application running on a remote computing device, the print job request comprising a print job name and a location indicator indicating a storage location of a 3D print file to be printed wherein the storage location is accessible by user application but not by the first software module;

sending a print job ID by the first software module back to the user application;

receiving the print job ID by the first software module from a second software module;

sending a print job response by the first software module back to the software module, the print job response comprising the print job ID, the print job name and the location indicator of the print file;

receiving a print request by a second software module from the user application, the print request comprising the print job ID and a printer ID;

sending the print job ID by the second software module to the first software module;

receiving a print job response by the second software module back from the first software module, the print job response comprising the print job ID, the print job name and the location indicator of the print file;

pushing a printer message by the second software module to a printer message queue, wherein the printer message comprises the location indicator of the print file;

retrieving the printer message by a web-socket gateway from the printer message queue and forwarding a dedicated printer message by the web-socket gateway to a 3D printer, the dedicated printer message comprising the location indicator of the print file.

According to a further aspect, there is provided a computer program product comprising code embodied on computer-readable storage and configured so as when run on one or more processing units to perform the method as described above.

BRIEF DESCRIPTION OF THE DRAWINGS

These and other aspects of the invention are apparent from and will be elucidated with reference to the embodiments described hereinafter. In the drawings, FIG. 1 schematically shows a print job processing system according to the prior art.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

Figure 1:
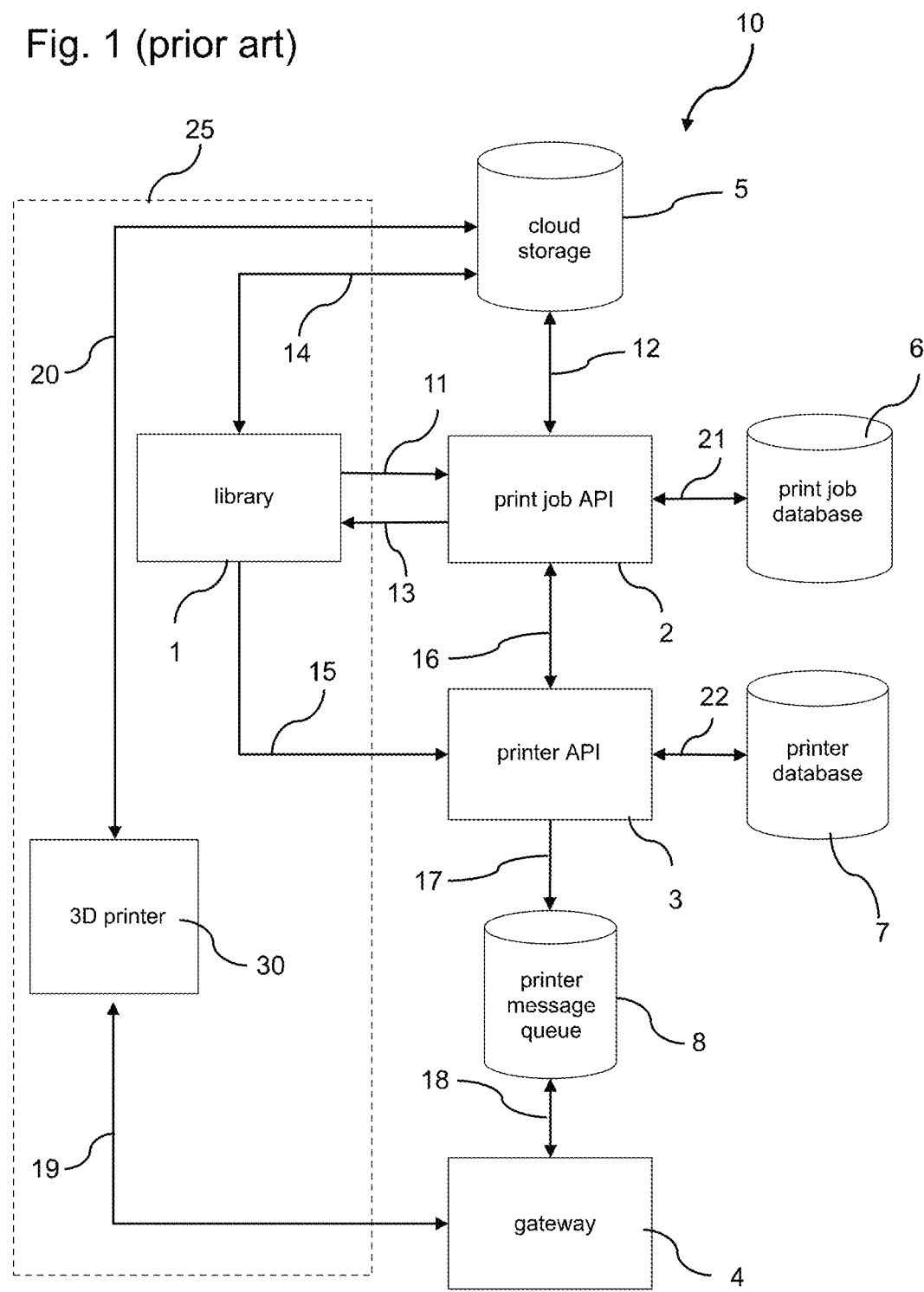

FIG. 1 schematically shows a print job processing system 10 according to the prior art. The print job processing system 10 can be used by a user in order to select one or more 3D objects out of a library and print the selected 3D objects via a print service operated by another party, also referred to as the Service provider. The print service is web-based which means that the service can be activated by means of connecting to the Internet. The print processing system is arranged to manage print jobs, so that the user is able to print the 3D objects using their own 3D printer, see 3D printer 30 in FIG. 1.

It is noted that the service provider does not provide a printing service in the way that it prints parts and ships them to the client. Rather, the service provider provides a cloud-based service for the clients to print parts on the printers located at the client's premises, wherein print jobs are managed and processed via the web-based service.

In the example of FIG. 1, the print job processing system 10 comprises several software modules, such as a library application 1, a print job API 2, a printer API 3 and a web-socket gateway 4. The print job processing system 10 further comprises several object storage modules, such as a cloud storage 5, a print job database 6, a printer database 7 and a printer message queue 8.

The library application 1 may be a program running on a computer device (e.g. PC, laptop, mobile phone) under the full control of the customer (i.e. user). Alternatively, the library application 1 may run in a private cloud of the customer. The library application 1 is also referred to as the user application 1. In FIG. 1, the dashed box 25 indicates a firewall of a local area network (LAN) managed by (the company of) the user. As can be seen in FIG. 1, the library application 1 and the 3D printer 30 are both arranged behind the firewall 25.

Now a typical workflow for processing a print job is described wherein a user enters a print command in the library application 1. After receiving the print command from the user, the library application 1 requests the print job API 2 for a new upload out of the cloud storage 5, see arrow 11. The print job API 2 will then request a signed upload URL from the cloud storage 5. The cloud storage 5 may be e.g. a Google cloud storage bucket. Google provides a system wherein URLs are signed. A signed URL can only be used to either download (GET) or upload (PUT) the file, but not both. This is a security measure from Google. Other S3 compatible storage providers provide similar services.

Google generates a token that is unique for every generated signed URL. This token is then added to the URL as a query parameter and only the application that knows the token (i.e. the application that requested it) can then use that URL (or pass it along to another part of the system). This is further secured by coupling the token to a method, an expiry date, and other optional parameters to further reduce what can actually be done with the signed URL.

The system can be configured in such a way that the application that knows the signed URL can only upload or download that specific file once, and only from a certain remote origin (validated by Google Cloud Storage using HTTP headers), and only before the expiry date.

The print job API 2 will send the signed upload URL back to the library application 1, see arrow 13. Next, the library application 1 uploads a print file (e.g. a G-code file) to the cloud storage bucket 5 using the signed upload URL, see arrow 14.

The library application 1 will then send a request to the printer API 3 for the uploaded print file to be printed, see arrow 15. The printer API 3 will then request a print job signed download URL from the print job API 2, see arrow 16. Then the printer API 3 sends a printer message to the printer message queue 8, see arrow 17. This printer message comprises the signed download URL. Next, the web socket gateway 4 pulls the printer message from the printer message queue 8, see arrow 18. The web-socket gateway 4 will then send a dedicated printer message to the 3D printer 30, via a WSS connection between the 3D printer 30 and the web-socket gateway 4, which connection was set up by the 3D printer 30 beforehand, see arrow 19. After receipt of the dedicated printer message, the 3D printer 30 will then download the print file from the cloud storage 5 using the signed download URL, see arrow 20.

In this example the print job API 21 stores the print jobs in the print job database 6, see arrow 21. Furthermore, the printer API may store printer information for each printer in the system into the printer database 7, see arrow 22.

Although the print job processing system described above, will perfectly work for many users, some users may not allow the sharing of print files in the cloud environment of the Service provider since these print files may contain intellectual property owned by the user. Below an alternative system is described that will take away this main concern of such users.

Figure 2:
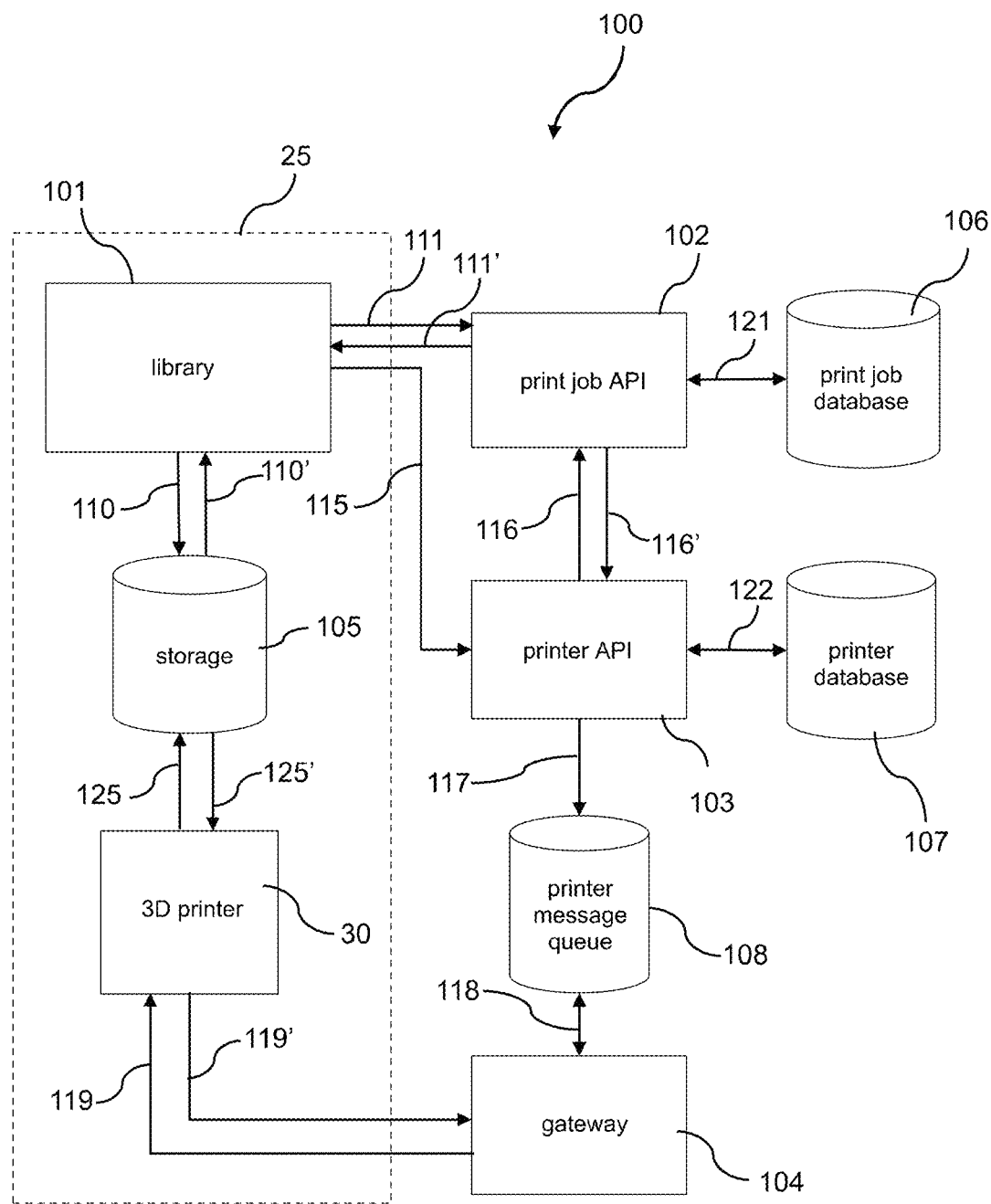
FIG. 2 schematically shows a print job processing system according to an embodiment of the present invention.

FIG. 2 schematically shows a 3D print job processing system 100 according to an embodiment of the present invention. Like the one described in FIG. 1, the 3D print job processing system 100 can be used by a user in order to select one or more 3D objects out of a library and print the selected 3D objects via a print service operated by a Service provider in the cloud. The print job processing system 100 is arranged to manage print jobs, wherein the user is able to print the 3D objects on their own 3D printer, see 3D printer 30 in FIG. 2.

The 3D print job processing system 100 comprises several software modules, such as a library application 101 (also referred to as user application 101), a print job API 102, a printer API 103 and a web-socket gateway 104. In the embodiment of FIG. 2, the 3D print job processing system 100 further comprises several object storage modules, such as a local storage 105, a print job database 106, a printer database 107 and a printer message queue 108.

The dashed line 25 in FIG. 2 indicates a firewall of an IP-network operated by (the company of) the user. The IP-network may be a LAN. The local storage 105 may reside on a computer device that is in the LAN, thus under the control of the user or of the organisation of the user. The library application 101 may be a program running on a computer device at a user's premises or on a mobile device such as a PC, a laptop, or a mobile phone. Alternatively, the library application 101 and/or the local storage 105 may run in a so-called private cloud. The library application 101 may comprise a part storage subsystem (not shown) arranged to store 3D print files in the local storage 105, see FIG. 2.

Whenever the library application 101 stores a print file into the local storage 105, see arrow 110, it will know the URL for the local storage 105, as it just uploaded the print file to that local storage 105 which returns the URL, see arrow 110'. This URL will be passed along to the software modules present outside the firewall 25 as will be explained in more detail below. Whenever a user wants to save a certain print file, they will enter a print file save command in the library application 101. After the library application 101 has received the print file save command, it will upload that print file 110 to the local storage 105 available on the local network. Once the user has entered a print command, the library application 101 sends the print job API 102 (which embodies the first software module) a request, see arrow 111, to send a print job to the 3D printer 30. The library application 101 attaches the local storage URL for the print job to the print job request 111 as a reference. The print job request 111 may comprise a print job name, the local storage location (URL) of print file, a print file size and a print file content type (e.g. G-code file, etc). The Print job API 102 will respond by sending a print job ID back, see arrow 111'.

After having received the print job ID 111' back from the Print job API 102, the library application 101 will send a print request to the printer API 103 (which embodies the second software module), see arrow 115. This print request 115 may e.g. be sent via an HTTPS connection, between the library application 101 and the cloud service running the print job API 102 and the printer API 103. The print request 115 comprises the print job ID, and the printer ID (known to the user application 101 due to connecting the printer to the system at an initialisation phase). After receipt of the print request 115, the printer API 103 sends a print job call 116 to the print job API 102, the print job call 116 comprising the job ID. The Print job API 102 will then send a print job response 116' back to the Printer API 103. The print job response 116' may comprise a print job ID, a print job name, the local storage location (URL) of print file, a print file size, and a print file content type.

Then, see arrow 117, the printer API 103 pushes a printer message on the printer message queue 108. In an embodiment, the printer message comprises the printer ID, the print job ID, the print job name, the local storage location (URL) of print file, the print file size, and the print file content type. The printer message is pulled from the printer message queue 108 by the web-socket gateway 104, see arrow 118. The web-socket gateway 104 will use a printer ID contained in the printer message to identify the correct 3D printer. The web-socket gateway 104 will then send a dedicated printer message 119 to the connected 3D printer, i.e. 3D printer 30, which is followed by an acknowledge message 119' sent back by the 3D printer 30.

In an embodiment, the dedicated printer message 119 comprises the print job ID, the print job name, the local storage location (URL) of print file, the print file size, the print file content type. In this example the print job API 102 stores the print jobs in the print job database 106, see arrow 121. Furthermore, the printer API 103 may store printer information for each printer in the system into the printer database 107, see arrow 122.

It is noted that the web-socket gateway 104 may be connected to the 3D printer 30 by means of a Web Socket Secure (WSS) connection, or any other suitable secure network communication.

It is noted that the local/private storage URL is sent along with the printer messages and the dedicated printer messages to the 3D printer 30. Once the 3D printer 30 has received the dedicated printer message 109, it will put it in the print queue. The printer 30 will use the local/private URL to send a download request 125 to the correct local/private storage 105, which sends back the print file, see arrow 125'. This downloading may be executed by way of sending an HTTP call from the 3D printer 30 to the local storage 105.

It is noted that the local/private storage 105 can be any storage solution, as long as it exposes the print file over the HTTP and the 3D printer 30 can access the URL.

The system 100 described in FIG. 2 allows the users to separate the sensitive IP data from process-related data. The IP data contains the actual 3D designs/models or printing instructions and could be used by unauthorized parties to replicate parts and thus get a hold of designs that can be under intellectual property protection. The process-related data is less sensitive information and may contain data on whether a printer is online, a printing status of a printer, and/or the ID of a print job.

It is noted that instead of using a local storage, such as local storage 105, the user could still choose to use a cloud storage bucket instead. In that embodiment they only need to pass the signed download URL from their library application to the first software module 102. It is noted that such signed URLs do not give full access to the bucket. Basically, by just using HTTP URLs as reference instead of a specific technology like an S3 storage bucket, the user can choose whatever they want to use, it's completely agnostic to the service provider, and they will never have to process the actual file contents.

Figure 3:
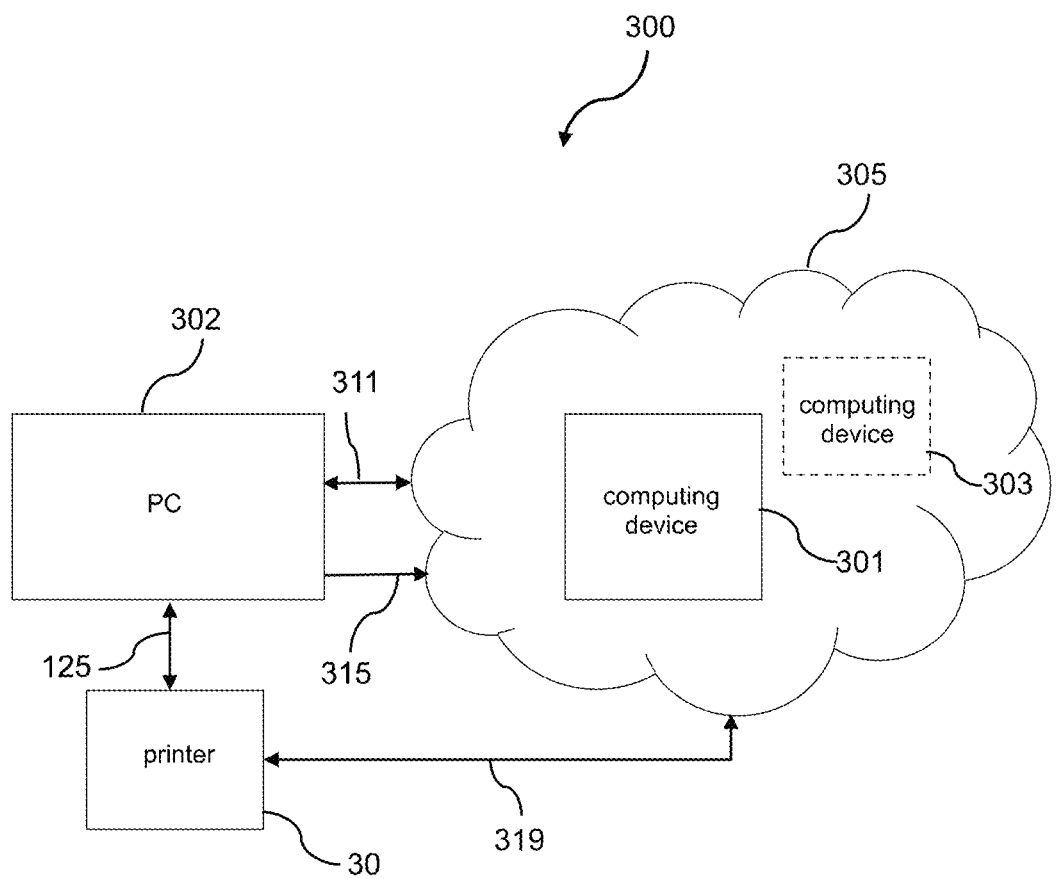
FIG. 3 schematically shows a print job processing system according to an embodiment.

FIG. 3 schematically shows a print job processing system 300 according to an embodiment. The system 300 comprises a computing device 301 arranged to run a cloud application within a cloud 305. The cloud 305 may also comprise more devices such as a further computing device 300 in communication with the computing device 301. FIG. 3 also shows a PC (personal computer) 302 arranged to send print files to the printer 30 as already described with reference to FIG. 2. The PC 302 is arranged to run a library application as described above with reference to FIG. 2. This enables the user of the PC 302 to use a cloud service for managing the print jobs and the connected printers, e.g. the 3D printer 30. The PC 302 may also comprise a storage embodying the local storage 105, see FIG. 2. In FIG. 3, an arrow 311 indicates a HTTPS connection between the PC 302 and the cloud 305. Via this HTTPS connection the library application 101 can send the print job request 111. An arrow 315 indicates a HTTPS connection between the PC 302 and the cloud 305 through which the library application 101 can send the print request 115.

Arrow 319 indicates a WSS connection arranged between the 3D printer 30 and an entity in the cloud (i.e. the web-socket gateway 104 of FIG. 2) running on the computing device 301 or on the further computing device 303. To further secure the print job processing, the PC 302 and the printer 30 may be located behind a firewall, such as the firewall 25 shown in FIG. 2.

The computing device 301 may be arranged to run the print job API 102 also referred to as the first software module. The computing device 301 may also be arranged to run the other cloud modules shown in FIG. 2, such as the printer API 103, the printer message queue 108 and/or the web-socket gateway 104.

Figure 4:
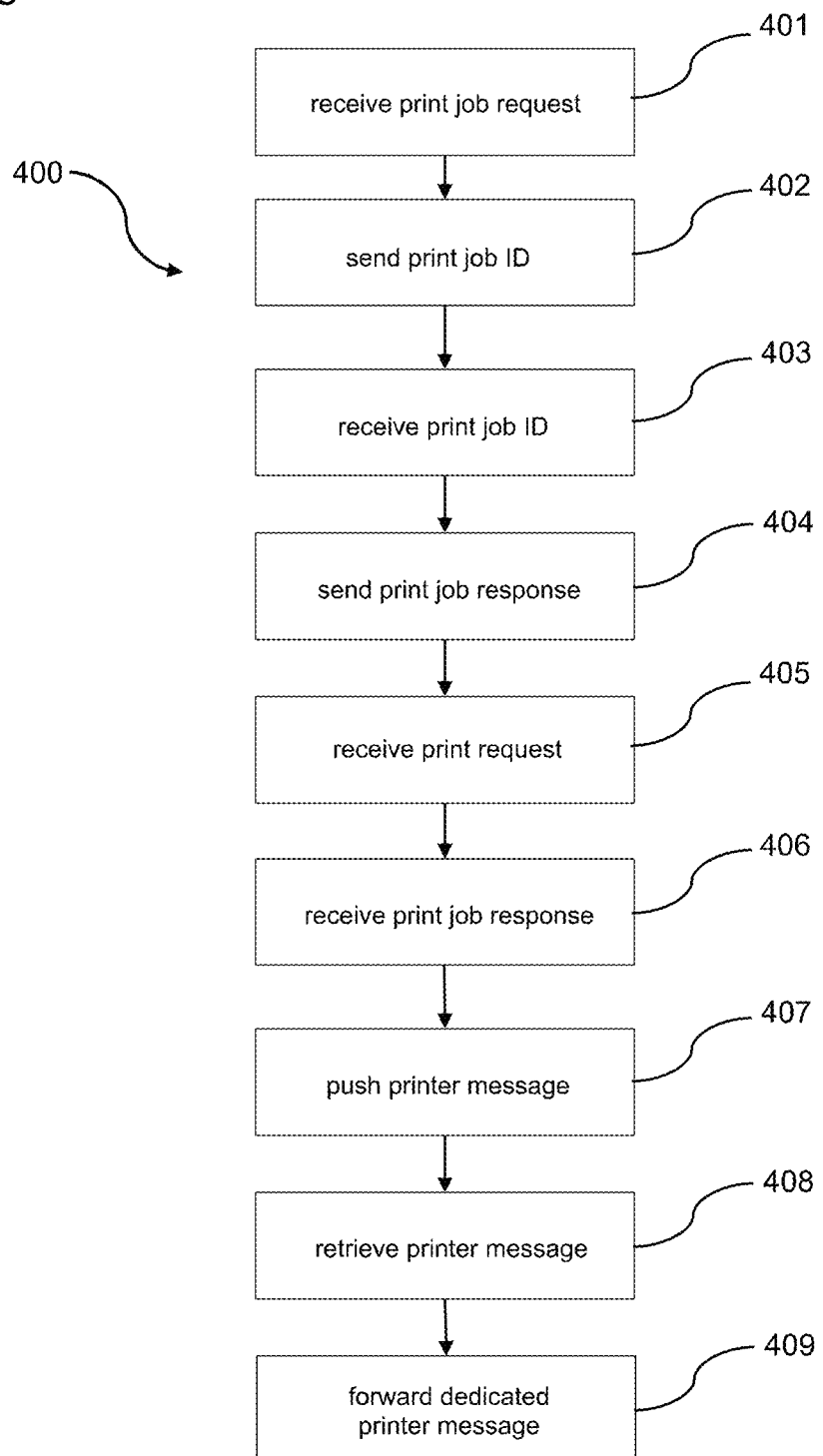
FIG. 4 is a flow chart of a method of processing print jobs according to an embodiment, and FIG. 5 schematically shows an embodiment of the computing device.

FIG. 4 is a flow chart of a method 400 executed partly by the first software module 102 (i.e. the print job API), the second software module 103 and the web-socket gateway 104 according to an embodiment. The method 400 comprises the receiving 401 of a print job request 111 by a first software module 102 from a user application 101 running on a remote computing device, the print job request comprising a print job name and a location indicator indicating a storage location of a print file to be printed, wherein the storage location is accessible by user application 101 but not by the first software module 102. The method 400 also comprises sending 402 a print job ID by the first software module 102 back to the user application, and receiving 403 the print job ID from a software module 103. The method 400 also comprises sending 404 a print job response 116' by the first software module 102 back to the software module 103, wherein the print job response 116' comprises the print job ID, the print job name and the location indicator of the print file.

The method 400 also comprises receiving 405 a print request 115 by a second software module 103 from the user application, the print request comprising the print job ID and a printer ID. The method 400 also comprises sending the print job ID 116 by the second software module 103 to the first software module 102. The method 400 also comprises receiving 406 a print job response 116' by the second software module 103 back from the first software module 102, the print job response 116' comprising the print job ID, the print job name and the location indicator of the print file.

The method 400 also comprises pushing 407 a printer message 117 by the second software module 103 to a printer message queue 108, wherein the printer message comprises the location indicator of the print file. The method 400 also comprises retrieving 408 the printer message by a web-socket gateway 104 from the printer message queue 108 and forwarding, see action 409, a dedicated printer message 119 by the web-socket gateway to a 3D printer, the dedicated printer message comprising the location indicator of the print file.

Contrary to the prior art, the print job API 102 is not involved in initiating a storage location for the print file, and as such is not able to access the print file. Only the location of the print file is communicated, but this location is out of reach for the print job API 102 because of the presence of the firewall 25, or other security measure taken by the user, such as using a local IP address for the local storage 105.

Figure 5:
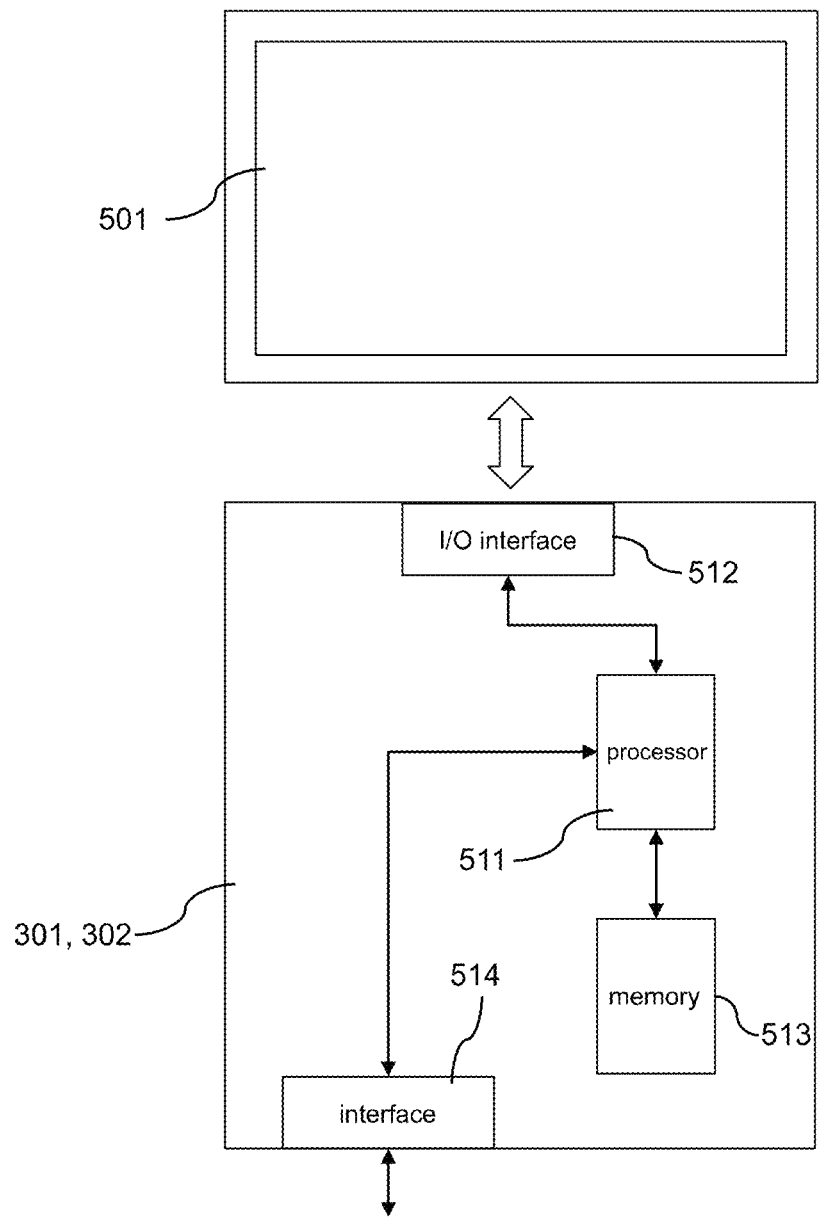

FIG. 5 schematically shows an embodiment of the computing device 301. The computing device 302 may also be arranged in a similar way. The computing device 301 comprises a processing unit 511, an I/O interface 512 and a memory 513. The processing unit 511 is arranged to read and write data and computer instructions from the memory 513. The processing unit 511 may also arranged to communicate with sensors and other equipment via the I/O interface 512. The computing device 301 may also comprise an interface 514 arranged to communicate with other devices via a LAN or WAN (not shown). The memory 513 may comprise a volatile memory such as RAM, or a non-volatile memory such as a ROM memory, or any other type of computer-readable storage. The memory 513 may comprise a computer program product comprising code configured to make the processing unit 511 perform the method of FIG. 4. In case of the computing device 302, the memory 513 may also comprise the local storage 105. FIG. 5 also shows a display 501 which may be connected to the interface 512 so as to show information regarding the library application 101 and/or a slicing program for preparing a 3D object for printing.

The method described above is more elegant than state-of-the-art solutions like deploying the entire cloud application landscape in the environment of the customer (i.e. user) themselves, which will bring high maintenance and operational costs. It is very likely the customer already has their own (local) storage system, which they can re-use in the described solution. If not, they can set up a storage system relatively easy (using e.g. a valid HTTP URL). Each customer can customize the storage system for their purpose and scale. The method guarantees that the service provider has no access to the storage system (as opposed to a configurable cloud storage buckets to which the service provider would still store the access credentials).

The present invention has been described above with reference to a number of exemplary embodiments as shown in the drawings. Modifications and alternative implementations of some parts or elements are possible and are included in the scope of protection as defined in the appended claims.

It should be noted that the above-mentioned embodiments illustrate rather than limit the invention, and that those skilled in the art will be able to design many alternative embodiments. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

LIST OF ABBREVIATIONS

API Application Programming Interface
HTTP Hyper Text Transfer Protocol
HTTPS Hyper Text Transfer Protocol Secure
URL Uniform Resource Locator
S3 Simple Storage Service
ID Identification
IP Internet Protocol
I/O Input/Output
3D three Dimensional
LAN Local Area Network
VAN Virtual Area Network
WAN Wide Area Network
VPC Virtual Private Cloud

The invention claimed is:

1. A system for processing 3D print jobs, the system comprising:
   a first software module arranged to receive a print job request from a user application running on a remote computing device, the print job request comprising a print job name and a location indicator indicating a storage location of a print file to be printed, the storage location being accessible by user application but not by the first software module, wherein the first software module is arranged to send a print job ID back to the user application;
   a second software module arranged to receive a print request from the user application, the print request comprising the print job ID and a printer ID, wherein the second software module is further arranged to send the print job ID to the first software module, and to receive a print job response back from the first software module, the print job response comprising the print job ID, the print job name and the location indicator of the print file;
   a printer message queue arranged to store printer messages, wherein the second software module is arranged to push a printer message to the printer message queue, wherein the printer message comprises the location indicator of the print file;
   a web-socket gateway arranged to retrieve the printer message from the printer message queue and forward a dedicated printer message to a 3D printer, the dedicated printer message comprising the location indicator of the print file.

2. The system according to claim 1, wherein the print job request further comprises at least one of:
   a print file size; and
   a print file content type.

3. The system according to claim 2, wherein the print job response further comprises at least one of:
   the print file size; and
   the print file content type.

4. The system according to claim 1, wherein the web-socket gateway is arranged to forward the print file size and the print file content type to the 3D printer.

5. The system according to claim 1, wherein the system further comprises an IP-network secured by means of a fire-wall, wherein the IP-network comprises a computing device running the user application.

6. The system according to claim 5, wherein the IP-network comprises a local storage arranged to store the print file.

7. The system according to claim 1, wherein each of the first software module and the second software module are implemented as an API module in a cloud-based computing system.

8. A method of processing print jobs, the method comprising:
   receiving a print job request by a first software module from a user application running on a remote computing device, the print job request comprising a print job name and a location indicator indicating a storage location of a 3D print file to be printed, wherein the storage location is accessible by user application but not by the first software module;
   sending a print job ID by the first software module back to the user application;
   receiving the print job ID by the first software module from a second software module;
   sending a print job response by the first software module back to the software module, the print job response comprising the print job ID, the print job name and the location indicator of the print file;
   receiving a print request by a second software module from the user application, the print request comprising the print job ID and a printer ID;
   sending the print job ID by the second software module to the first software module;
   receiving a print job response by the second software module back from the first software module, the print job response comprising the print job ID, the print job name and the location indicator of the print file;
   pushing a printer message by the second software module to a printer message queue, wherein the printer message comprises the location indicator of the print file;
   retrieving the printer message by a web-socket gateway from the printer message queue; and
   forwarding a dedicated printer message by the web-socket gateway to a 3D printer, the dedicated printer message comprising the location indicator of the print file.

9. A computer program product comprising code embodied on a non-transitory computer-readable storage medium and configured so as when run on one or more processing units to perform the method according to claim 8.

* * * * *